Patented Oct. 30, 1934

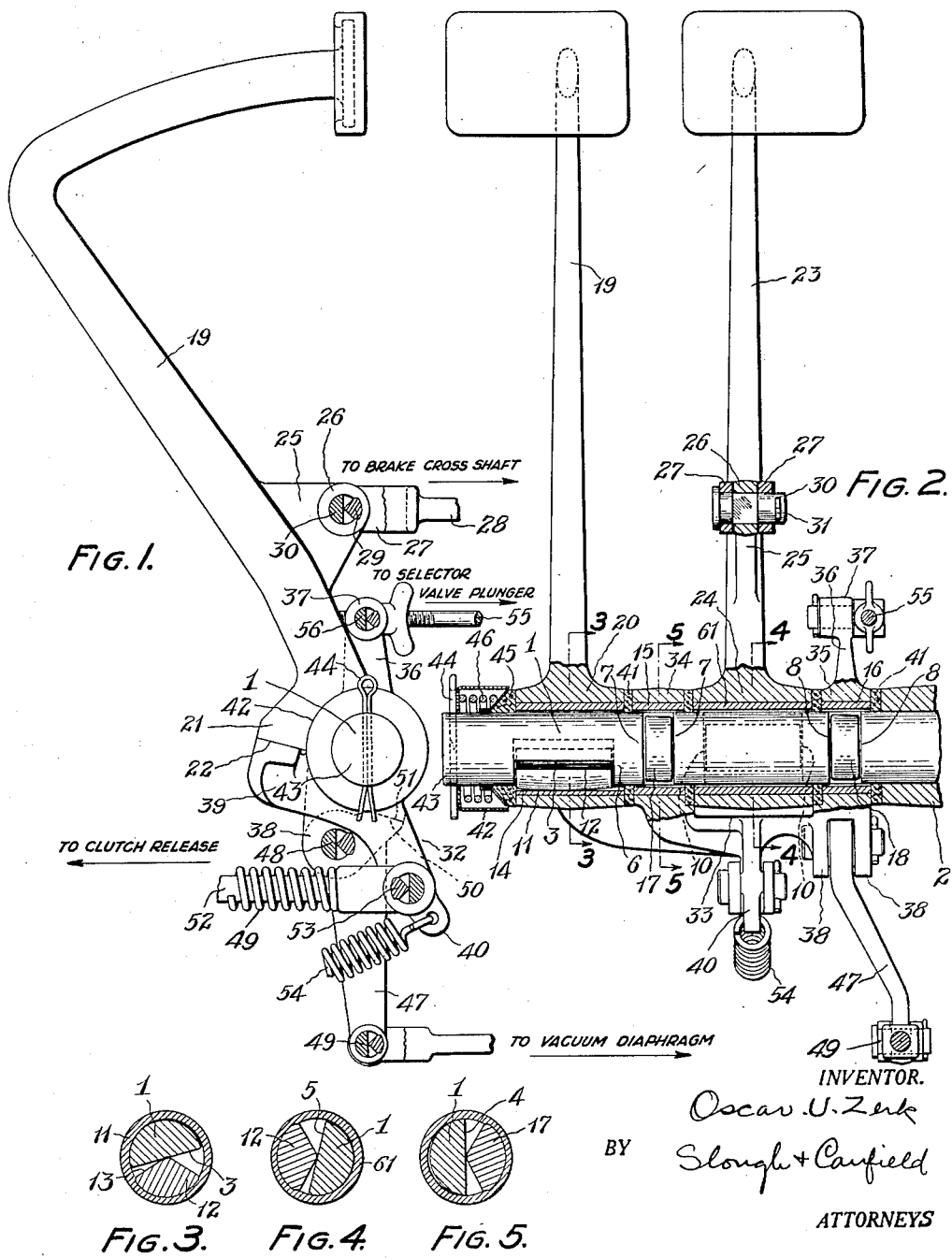

1,978,977

UNITED STATES PATENT OFFICE 1,978,977

MECHANICAL ELEMENT AND BEARING THEREFOR

Oscar U. Zerk, Cleveland, Ohio

Application April 12, 1932, Serial No. 604,772

9 Claims. (Cl. 308—2)

My invention relates generally to levers, and particularly to a plurality of pedal-actuated and other levers positioned in spaced relation along a common shaft.

A principal object of my present invention is to provide an improved oscillatory bearing for levers, and the like, wherein relative movement of the lever and a shaft upon which it is mounted may be accomplished without the introduction of objectionable friction between the relatively movable parts, even though little or no lubricant is applied to the bearing surfaces of the said parts.

Another object of my invention is to provide, in a lever of the above mentioned type, an improved oscillatory bearing of the so-called knife edge type, which while in use may be effectively sealed against the ingress of dirt and foreign substances to the bearing surfaces.

Another object of my invention is to provide, in a lever of the above mentioned type, an improved oscillatory bearing mechanism wherein objectionable lateral movement of the bearing parts is effectively prevented in a simple inexpensive manner.

Another object of my invention is to provide an improved means of effectively sealing the bearing mechanism of a plurality of levers mounted on a common shaft against the ingress of foreign substances to the bearing surfaces.

Another object of my invention is to provide an improved bearing mechanism which is of a special application to levers or the like, and wherein a shaft is employed to form an element of the bearing in combination with other bearing means disposed within a portion of the lever encircling the shaft.

Another object of my invention is to provide an improved means of mounting a plurality of relatively oscillatory levers upon a common shaft wherein the shaft is employed to form an element of the lever bearing in combination with other bearing means disposed intermediate the shaft and a portion of the lever encircling the shaft, and wherein relative lateral movements of the parts are effectively prevented.

Another object of my invention is to provide an improved means of mounting relatively rotatable levers upon a shaft by employing knife edge type bearings and connecting relatively oscillating elements to the said levers by knife edge type bearings, in such manner that the knife edges are always in pressure engagement with the bearing surfaces irrespective of the direction of the application of the power to the levers.

Another object of my invention is to provide an improved means of mounting a plurality of relatively rotatable levers on a shaft wherein pressure is exerted against the shaft by the levers in a plurality of angularly spaced directions.

Another object of my invention is to provide for a lever or the like bearing wherein improved self-sealing packing elements maintain the bearing surfaces proper in non-frictional condition.

Another object of my invention is to provide an improved bearing for levers or the like wherein a hinging or oscillating movement will be effected with a minimum amount of friction.

Another object of my invention is to provide an improved lever bearing mechanism having durable stainless steel bearing surfaces.

Another object of my invention is to provide a lever bearing of the above type employing relatively inexpensive parts which may be easily and efficiently assembled.

Another object of my invention is to provide an efficient bearing mechanism for levers or the like of the knife oscillatory type wherein the so-called knife edge element of the bearing is provided with an improved blunted rolling bearing edge making practically no sliding movement on any cooperating bearing surface.

Other objects of my invention and the invention itself will become more apparent to those skilled in the art to which my invention appertains by reference to the following description of certain embodiments of my invention which are illustrated in the accompanying drawing, wherein:

Fig. 1 is an elevational view of an automobile brake and clutch actuating mechanism embodying my invention, wherein the shaft is fixed and the brake lever adapted to rock thereabout and actuate the brake cross shaft, and a dual means of controlling the release of the clutch is employed. The clutch release rod being rotatably supported on the shaft and being adapted to be operated either by pressure exerted on the foot pedal or by a vacuum diaphragm associated with the intake manifold of the automobile engine;

Fig. 2 is a front elevational view, partially in sections of the mechanism illustrated in Fig. 1;

Fig. 3 is a section taken along lines 3—3 of Fig. 2, showing the manner of mounting the clutch lever upon the shaft;

Fig. 4 is a section taken along lines 4—4 of Fig. 2, showing the manner of mounting the brake lever upon the shaft; and Fig. 5 is a section taken along lines 5—5 of Fig. 2, showing the manner of mounting on the shaft, the lever which controls the operation of the vacuum diaphragm by means of the selector valve plunger.

The embodiment of my invention illustrated in the drawing is applied to the purpose of effecting the foot pedal control functions of an automotive vehicle, there being illustrated in the drawing and previously described a pair of levers rotatable on a common shaft, one being the usual brake lever for the automobile and the other being the usual clutch lever, these levers being arranged for the purposes and substantially in the manner wherein such levers are found on the current model of Buick automobiles, whereby the so-called "Master Control" system is effected such "Master Control" system being very well known at the present time to those skilled in this art.

In this "Master Control" system, as usually applied, the brake and clutch levers as well as the auxiliary levers are journaled in such a way that after any considerable period of use, the frictional contact between the levers and the shaft means on which the levers are journaled is excessive, so that more and more effort must be exerted by the operator to accomplish the operation of the levers, which as illustrated are joined to brake and clutch mechanism through link rods as described, and which are the same as the corresponding rods in the said well known "Master Control" system.

It is to be understood, however, that my invention is not limited to the so-called "Master Control" system, but may be applied to any and all levers which are provided with bearings at their fulcrums or elsewhere and in some of its aspects is directed particularly to the provision of a plurality of such levers arranged in parallel proximity in association with a common supporting shaft.

Referring to the drawing—

A shaft 1 is suitably supported in fixed relation with the body of the vehicle as indicated at 2 and elsewhere, by keying thereto or the like. The shaft is formed with substantially semi-cylindrical portions forming bearing surfaces and intermediately disposed cylindrical portions and is preferably composed of rustless or stainless chromium steel suitably hardened. The bearing surfaces which are best illustrated in Figs. 3, 4 and 5 are disposed relatively angularly and generally at right angles to the direction of the force applied thereagainst.

The bearing surface 3 is provided by cutting away a portion of the shaft substantially along a diameter, intermediate substantially semi-circular faces 6. The shaft is then cylindrical for a relatively short longitudinal distance and is then cut away in a plane generally at right angles to bearing surface 3 to provide bearing surface 4 intermediate the substantially semi-circular faces 7, bearing surface 5 intermediate the substantially semi-circular faces 10, and bearing surface 9 intermediate the substantially semi-circular faces 8. The section intermediate the semi-circular faces 8 is a duplicate of the section showing intermediate semi-circular faces 7, which is shown in Fig. 5.

Bushings 11 and 61 encircle the bearing surfaces 3 and 5, and are provided with a concentric recessed portion in the inner wall thereof, within which are non-rotatably secured the knife edge sectors 12. The knife edge sectors 12 are adapted to rock axially of the shaft bearing surfaces 3 and 4 as the bushing is relatively rotated. The ridge faces 13 and the bearing surfaces 3 and 4 form variable chambers therebetween dependent upon the relative position of the sector and the shaft, the ridge faces 13 preferably do not contact the bearing surfaces 3 or 4, due to the relatively limited rocking action required to effect the purpose of the mechanism. However, if desired, such contact would act as a limitation of the rocking movement. The portion of the sector 12 which engages the bushing walls is preferably slightly curved longitudinally whereby it will normally seat at the mid point thereof but will be permitted to rock longitudinally of the bushing due to the clearance therebetween as indicated at 14. The sector 12 will thus be constrained to rotate radially with bushing 11 but will be permitted to rock in a limited longitudinal direction therewith.

It is to be noted that sufficient clearance is provided between the interior wall of the bushing and the arcuate portion of the semi-cylindrical shaft to accommodate a relative vertical movement due to the rocking action therebetween. Bushings 15 and 16 encircle the bearing surfaces 4 and 9 respectively and are telescoped over the adjacent cylindrical portion of the shaft. Knife edge sectors 17 and 18 are disposed in recesses provided in bushings 15 and 16 in a manner hereinbefore described, and rockingly and axially engage the bearing surfaces 4 and 9.

It will be observed that a slight clearance is provided between the ends of the sector 12 and the parallel substantially semi-circular shaft faces 6 sufficient to accommodate longitudinal clearance required due to rocking action of the sector. Like provisions are made between the shaft faces 7, 8, and 10, and the intermediately disposed sectors 12, 17, and 18.

A conventional clutch lever generally indicated at 19 provided with a flanged hub 20 which is suitably bored whereby the clutch lever 19 may be non-rotatably secured to the bushing 11 preferably by press-fitting. The hub 20 is preferably the same length as the bushing 11 intermediate the vertical faces thereof. The clutch lever 19 is provided with a rearwardly and laterally extending lug 21 provided with a faced surface 22 whereby the clutch may be released in a manner to be hereinafter described. The clutch lever 19 is therefore freely rotatable about the shaft 1 upon which it is mounted by the knife edge bearing, upon the application of foot pressure and only actuates the clutch through the medium of surface 22 of the lug.

A conventional brake lever 23 is provided with a generally circular flanged hub 24 bored so as to make press-fitting engagement with the bushing 61 and thereby be non-rotatably secured thereto, and intermediate the axis of the shaft and a foot pedal is provided with an integrally secured, generally triangular shaped lug 25. The lug 25 is provided with annular suitably faced bosses 26 which provide engaging faces for forks 27 of a brake cross shaft 28. The lug 25 and the forks 27 are provided with aligned apertures, the aperture in lug 25 being recessed as hereinbefore described to secure therein a bearing sector 29, is preferably of a length corresponding to the width of the lug 25 intermediate the boss faces 26. A headed cylindrical pin 30 is cut away as previously described to form a bearing surface for the knife edge sector 29, the thus formed semi-circular faces limiting lateral movement of the sector. The pin 30 is positioned in the apertures provided therefor in the fork 27 with the head thereof abutting the outer face of one of the forks and keyed in place by a cotter key 31.

A clutch actuating member, generally designated at 32 comprises a generally rectangular base 33, having extended upwardly therefrom at the base ends the parallel eyes 34, 35 which encircle the bushings 15 and 16 respectively and are non-rotatably secured thereto preferably by press-fitting.

The eye 35 has integrally secured thereto the upwardly extending lever arm 36 provided with the apertured hub 37. Parallel spaced forks, generally triangular shape and provided with aligned apertures therethrough are integrally secured to and extend downwardly from the base 33 as indicated at 38. A faced lever 39 is integrally secured to the base 33 and extends rearwardly and laterally therefrom adjacent eye 34, the faced portion of which is adapted to engage surface 22 of clutch lever 19. A lever extends forwardly and downwardly and generally centrally from the base 33 and is adapted to engage the clutch release rod 25 whereby the clutch may be disengaged. It will thus be seen that the element 32 is rockingly mounted on shaft 1 by means of the upstanding eyes 34 and 35 and that any movement thereof will relatively actuate the integrally secured lever 36, the forks 38, the clutch pedal engaging member 39, and the clutch release lever 40. Packing rings 41 formed of a suitable material encircle the cylindrical portions of the shaft and are disposed intermediate the bushings 11, 15, 16, 61 and the elements to which these bushings are non-rotatably secured. A cup-shaped preferably sheet metal element 42 is disposed over the cylindrical end of the shaft by means of an aperture provided in the base therein and is prevented from longitudinal movement by a key 44 disposed in an aperture 43 provided adjacent the shaft end.

A preferably frusto-conical shaped packing ring 45 engages the outer face of hub 20 of clutch lever 19 and bushing 11, and is held in spring-pressed relation therewith and also against the shaft by a normally compressed spring 46 seating upon a preferably sheet metal, frusto-conical shaped element in engagement therewith. It will be observed that inasmuch as sufficient clearance is provided both radially and longitudinally for the bushings encircling the shaft to move laterally thereof, that the pressure exerted by the compressed spring 46 will be transmitted laterally, thus ensuring that sufficient pressure will be exerted on the intermediately disposed packing rings 41 to prevent the entry of grit or other abrasive foreign substances to the bearings.

Since the frusto-conical shaped packing ring 45 is wedgingly secured against the shaft end and exerts compressive stress on the packing rings 41 all the bushings and enclosed bearing elements are effectively sealed.

A lever 47 is rockingly supported intermediate the forks 38 by a knife edge bearing generally indicated at 48 in a manner previously described in connection with the brake cross shaft. Lever 47 at the lower end is connected to a forked rod linked to a vacuum diaphragm (not shown) by a knife edge bearing generally indicated at 49 and previously described in connection with the brake cross shaft.

At its upper end the lever 47 is provided with a faced lug 50, which is adapted to engage a pad 51 on element 32 and rotates element 32 about shaft 1 as an axis and consequently its associated parts. The lever 40 is rockingly connected to a clutch release rod 52 by a knife edge bearing previously described and generally indicated at 53. A spring 54 is secured to the lever 40 and is suitably affixed at its other end (in a manner not shown) whereby the tension thereof will always tend to hold the clutch in an engaged position.

The hub 37 of the lever arm 36 which is integrally secured to the upstanding eye 35, is rockingly connected to a selector valve plunger (not shown) through the rod 55. The knife edge bearing generally indicated at 56 is generally similar to those previously described with the exception that the rod 55 is connected directly to the hub rather than through medium of a fork member and an adjustment means is preferably provided therefor.

The brake lever as it is rocked about the shaft will actuate the rod 28 which is secured to the brake cross shaft or equalizer bar. It will be observed that as illustrated in sections 4—4 and in the knife edge bearings whereby rod 28 is rockingly connected to the lugs 25, that the bearing surface of the pins against the knife element presses is generally at right angles to the plane of the force applied. Further, inasmuch as the force must be opposed by the knife edge, the knife edge is positioned generally in a direction opposite the line of applied force.

The clutch control mechanism is designed to provide a dual means of releasing or engaging the clutch in a manner well understood in the art. Normally the clutch will be operated by the clutch lever 19 through the face 22 thereon engaging member 32 and thereby actuating the clutch release rod 52 against the tension of the spring 49.

When the clutch lever is used the lever 47 will pivot away from the member 32 and not be effected in any manner by the rocking of the member 32. At idling speed the vacuum diaphragm is operated through association with the intake manifold of the car and thereby actuates rod 47 to move in a direction indicated by the arrow, thus causing the face 50 thereof to engage the pad 51 of the element 32, and thereby release the clutch through actuating rod 52 as hereinbefore described.

Lever 36 is connected to a selector valve plunger whereby the vacuum means will be rendered non-effective to release the clutch under conditions where it is desired to use the foot pedal or normal means of operation. This is usually controlled by advancing the throttle to a point beyond the effective range of the vacuum.

It will be observed that in applying knife edge type of bearing to such a mechanism wherein no lubrication is employed or a relatively small amount, that a considerable saving must necessarily result.

Although I have illustrated an embodiment of my invention, I contemplate that numerous and extensive departures may be made therefrom without departing from the spirit and scope of my invention and the appended claims.

I claim:

1. A bearing mechanism comprising a shaft provided with longitudinally and angularly spaced bearing surfaces substantially axially thereof, a plurality of mechanism members having portions encircling the said bearing surfaces and provided with knife edge portions engaging the said bearing surfaces whereby the mechanism members may be rocked on the shaft, and means associated with the said mechanism members for transmitting relatively reciprocating motion.

2. A bearing mechanism comprising a shaft provided with angularly and axially spaced bearing surfaces, a plurality of mechanism members having portions encircling said shaft and longitudinally rockable relative thereto and provided with knife edge portions engaging the said bearing surfaces, whereby a relative universal rocking action may be effected therebetween.

3. A bearing mechanism comprising a shaft provided with axially disposed bearing surfaces, a plurality of mechanism members having portions encircling the said shaft and provided with knife edge portions engaging the said bearing surfaces whereby a relative rocking action may be effected therebetween, packing means engaging the said shaft and opposite portions of each of the mechanism members whereby the bearing elements are sealed against the entry of foreign substances.

4. A bearing mechanism comprising a shaft provided with longitudinally alternate cylindrical and substantially semi-cylindrical portions, a plurality of mechanism members provided each with a head portion rotatably encircling the substantially semi-cylindrical portions, a knife edge sector rotatable with the head portion and rockingly engaging the substantially semi-cylindrical portions generally axially thereof.

5. A bearing mechanism comprising a shaft provided with alternate cylindrical and substantially semi-cylindrical bearing surfaces, a plurality of mechanism members provided each with a head portion rotatably encircling the said bearing surfaces, knife edge sectors in the head portions adapted to engage the said bearing surfaces generally axially thereof whereby a relative rocking action may be effected therebetween, said knife edge sectors engaging the head portions on relatively longitudinally rounded portions, and adapted to rock longitudinally thereof, whereby a limited relative universal movement may be effected between the shaft and the mechanism members.

6. A bearing mechanism comprising a shaft provided with cylindrical portions and alternate substantially semi-cylindrical portions longitudinally and angularly spaced, a plurality of mechanism members provided each with a head portion rotatably, and encircling the substantially semi-cylindrical portions, a knife edge sector longitudinally rockingly disposed in the said head portion and adapted to engage the substantially semi-cylindrical portions generally axially thereof, packing means encircling the cylindrical shaft portions and abutting the mechanism member head portions whereby an effective seal of the bearing elements is effected.

7. A bearing mechanism comprising a shaft provided with cylindrical portions and alternate semi-cylindrical bearing surfaces longitudinally and angularly spaced, a plurality of mechanism members provided each with a head portion rotatably encircling the said bearing surfaces, a knife edge sector adapted to engage the said bearing surfaces generally axially thereof and longitudinally rockingly seated in the lever head portion, packing means disposed alternately of the head portions encircling the cylindrical portions and abutting the mechanism member head portions, one of the said packing means being fixed longitudinally relative to the shaft, means compressively engaging an end packing element and exerting lateral pressure upon the head portions and intermediately disposed packing elements and against the fixed packing element, whereby the bearing elements are effectively sealed against the ingress of foreign substances.

8. A bearing mechanism comprising a shaft provided with cylindrical portions and alternate recessed substantially semi-cylindrical portions, hardened rustless steel bearing surfaces within said recesses, a plurality of mechanism members rotatably encircling said bearing plates, hardened rustless steel knife edge sectors generally axially engaging said surfaces and longitudinally rockingly seated in said encircling portions, and packing means for sealing said bearing elements against the entry of abrasive foreign substances.

9. A bearing mechanism comprising a shaft, a plurality of mechanism members oscillatably supported on the shaft, knife edge bearings for the mechanism members for transmitting lateral load pressure from the mechanism members to the shaft, comprising longitudinally spaced bearing surfaces upon the shaft and knife edge bearing elements rockingly engaging the bearing surfaces, at least two adjacent knife edge bearings being relatively angularly spaced whereby they may transmit load pressure in different lateral directions.

OSCAR U. ZERK.